United States Patent [19]

Hudspeth et al.

[11] Patent Number: 4,539,681
[45] Date of Patent: Sep. 3, 1985

[54] FERRITE MODULATOR ASSEMBLY FOR BEACON TRACKING SYSTEM

[75] Inventors: Thomas Hudspeth, Malibu; Harold A. Rosen, Santa Monica; Fritz Steinberg, Culver City, all of Calif.

[73] Assignee: Hughes Aircraft Company, El Segundo, Calif.

[21] Appl. No.: 469,870

[22] Filed: Feb. 25, 1983

[51] Int. Cl.³ .............................................. H04J 15/00
[52] U.S. Cl. .................................... 370/119; 333/122
[58] Field of Search ................. 370/119, 19, 11, 69.1, 370/118; 333/108, 122

[56] References Cited

U.S. PATENT DOCUMENTS

| 3,368,861 | 2/1968 | Rubinstein et al. | 455/616 |
| 3,956,699 | 5/1976 | Leahy | 370/19 |
| 4,385,378 | 5/1983 | Kreutel | 370/19 |

*Primary Examiner*—Douglas W. Olms
*Attorney, Agent, or Firm*—William J. Benman, Jr.; Anthony W. Karambelas

[57] ABSTRACT

A modulator system for converting a three-channel input microwave signal to a single-channel output microwave signal is formed of two microwave sections which are joined together at both their inputs and their outputs by hybrid circuits, one of which serves as a power divider and the other which serves as a power combiner. Each of the microwave sections includes a pair of couplers which are joined by a Faraday rotator. First and second microwave input signals are applied to a first port of an input coupler in each of these sections. A third microwave signal is connected by the hybrid divider to a second input port in the input couplers of each of the microwave sections. Polarization of the third signal is vertical and is maintained through the two sections. Polarization of the first and second signals is horizontal and is maintained through the two sections. With activation of the rotator, a shift in polarization occurs resulting in appearance of the signals in both the horizontal and vertical components of an output coupler in each of the sections. The vertical component of the output couplers in each of the sections is combined by the hybrid combiner to produce the single-channel microwave signal. Synchronous detectors are utilized for subsequent extraction of the first and second input signals, the synchronous detectors and the Faraday rotators being driven by common sources of modulation signals wherein the rotator in one section in modulated at a rate different from the rotator in the second section.

15 Claims, 5 Drawing Figures

FERRITE MODULATOR ASSEMBLY FOR BEACON TRACKING SYSTEM

BACKGROUND OF THE INVENTION

This invention relates to modulators and, more particularly, to a modulator providing for the multiplexing of the directional error signals and the sum signal generated in the tracking feed assembly to provide a single channel for amplification by a receiver which concurrently amplify command signals.

Cross-reference is hereby made to three copending applications pertaining to microwave systems assigned to the same assignee; "Square Conductor Coaxial Coupler" invented by T. Hudspeth, R. V. Basil and H. H. Keeling, Ser. No. 468,826, filed on Feb. 23, 1983; "Coaxial Transmission Line Crossing" invented by T. Hudspeth and H. H. Keeling, Ser. No. 468,827, filed on Feb. 23, 1983; and "Coaxial Line to Waveguide Adapter" invented by T. Hudspeth and H. H. Keeling, Ser. No. 468,825, filed on Feb. 23, 1983. These applications are hereby incorporated by reference in their entirety.

Communication satellites now in use provide communication links among many stations distributed over a large area of the earth. The communication antennas on the satellites may provide beams whose shape matches that of the area served. The communication performance of the satellite is improved when its beams are pointed accurately at the desired directions. The communication beam pointing accuracy is enhanced when ground beacon originating within or near the area served is tracked by the communication satellite antenna. This can be accomplished by embedding a tracking feed network within the communication feed assembly of the antenna, and processing the directional error signals to provide control of the antenna position.

Since two directional error signals and a sum, or reference signal, are generally needed for two-axis control systems, the signal processing is simplified if the microwave error signals are modulated and then multiplexed with the sum signal to provide a complex signal appropriate for amplification in a single channel receiver. It is therefore an object of the invention to attain the foregoing function of signal modulation and multiplexing by use of a ferrite modulator assembly in a structure which simplifies the task of providing a desired redundancy of active elements of the tracking system.

SUMMARY OF THE INVENTION

The foregoing objective is attained, and other advantages are provided, by a multiplexer and modulator circuit which, in accordance with the invention, includes ferrite modulators and microwave couplers which enable tracking of the beacon signal while amplifying command data. The multiplexing and modulating circuitry is readily utilized with a track and command receiver, and permits the extraction of the elevation and azimuth signals at an output terminal of the receiver for operating an antenna pointing unit.

The multiplexing and modulator circuitry is formed of two channels, each of which includes a Faraday rotator with a first orthogonal mode coupler at its input terminal and a second orthogonal mode coupler at its output terminal. Input terminals of each of the couplers are provided with a sum signal obtained from a hybrid power divider. The other input terminals of the first couplers of the two channels are connected, respectively, to the elevation error signal and the azimuth error signal from a feed network coupled to an antenna. The pair of output terminals of the second coupler in each channel is connected such that one of the output terminals of each coupler feeds power into a dummy load while the other terminal in each coupler provides signals which are combined in a hybrid power combiner to provide a composite output signal of the multiplexer and modulator circuit. For ease of description, the multiplexer and modulator circuit will be referred to hereinafter as simply a modulator.

Redundancy is provided by the operation of each Faraday rotator with two exciting coils for providing the magnetic fields which operate the rotators. The modulating signals can be applied either to one of the exciting coils or to the other of the exciting coils for the redundant operation. Thereby, the modulator provides increased reliability. There are no other circuitry components in the modulator, all other coupling of signals being accomplished at the microwave frequency by means of the rigid structures associated with the couplers and the hybrid power dividers and combiners.

In order to distinguish between the elevation and azimuthal signals after their modulation onto the carrier so as to permit the recovery of the signals by the demodulation process, the elevation signal is modulated as a 100 Hz (Hertz) amplitude modulation on the carrier. The azimuthal signal is modulated as a 200 Hz amplitude modulation on the carrier. The modulation is accomplished in a manner which preserves the relative strength of the elevation and azimuthal signals relative to the sum signal. This is accomplished by combining an error signal (elevation or azimuthal error signal) with the sum signal at the coupler, and then rotating the polarization of the combined signal with the Faraday rotator. The Faraday rotator is operated at the 100 Hz frequency, in the case of the elevation signal, and at the 200 Hz frequency, in the case of the azimuthal signal. With respect to both the first and second couplers in each of the channels, the polarizations of the original signals are maintained and, furthermore, it is the polarization of the sum signal which is coupled out of the couplers and into the hybrid combiner at the output terminal.

Upon the rotation of the electric vector of the microwave signal by the Faraday rotator, both components of the error signal and the sum signal appear in each output terminal of the second coupler in each channel. Thus, upon the activation of the rotator, both error signals appear in the output hybrid combiner, and both signals maintain their scaling factors relative to the sum signal. The switching of the polarization at the input terminal to the second coupler in each channel results in amplitude modulation appearing on the output signals thereof. Accordingly, the amplitude modulation appears in the output signal of the hybrid power combiner. Since the amplitude modulation of the elevation signal is at a 100 Hz rate while the amplitude modulation of the azimuthal signal is at the 200 Hz rate, the composite output signal has an amplitude modulation envelope formed as the summation of two rectangular wave signals, one of which is at 100 Hz and the other of which is at 200 Hz.

In the foregoing combination of the elevation and azimuthal signals, the command modulation and the frequency modulation of the carrier signal have been unchanged. Accordingly, upon amplification of the combined signal by a receiver, each of the signals can be filtered out, the elevation signal being extracted with the aid of a synchronous detector operated at 100 Hz while the azimuthal signal is extracted by a second synchronous detector operated at a 200 Hz rate.

BRIEF DESCRIPTION OF THE DRAWING

The foregoing aspects and other features of the invention are explained in the following description taken in connection with the accompanying drawing wherein.

DETAILED DESCRIPTION

Figure 1:
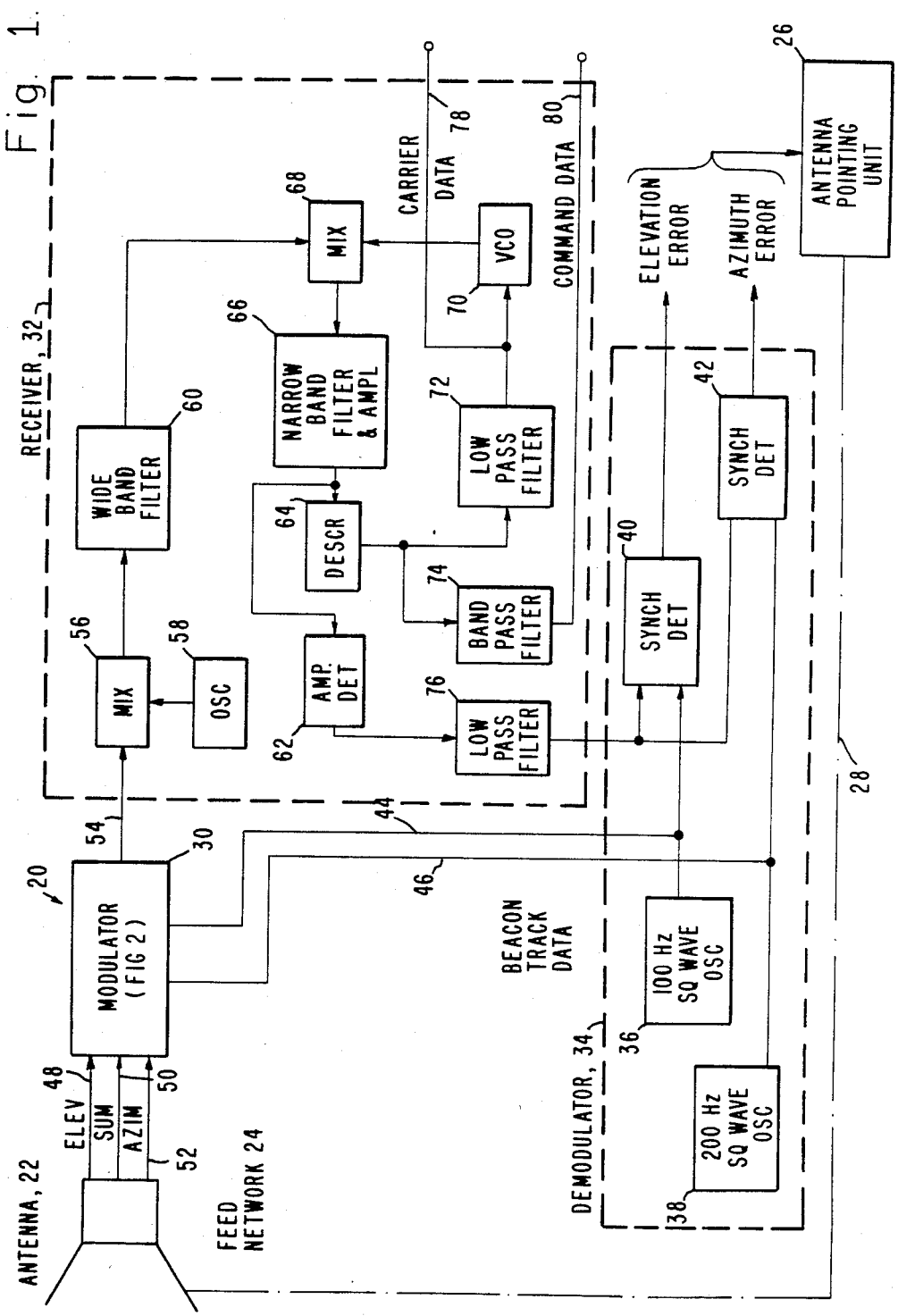
FIG. 1 is a block diagram of an exemplary satellite system incorporating the modulator of the invention.

In FIG. 1 there is shown an exemplary system 20 for use in a satellite. The system 20 includes an antenna 22 with a feed network 24 attached thereto, and an antenna pointing unit 26 mechanically coupled to the antenna 22 via line 28. The system 20 further comprises a modulator 30, a receiver 32 and a demodulator 34. The demodulator 34 includes an oscillator 36 and an oscillator 38 which operate, respectively, at 100 Hz and 200 Hz, and provides reference square-wave signals, respectively, to a synchronous detector 40 and a synchronous detector 42. The oscillators 36 and 38 also provide the reference signals along lines 44 and 46, respectively, for operation of Faraday rotators within the modulator 30 as will be described subsequently with reference to FIG. 2. The three output channels of the feed network 24, namely, the elevation channel, the sum channel and the azimuth channel are coupled, respectively, via lines 48, 50 and 52 as input signals to the modulator 30. The output signal of the modulator 30 appears on the single line 54 by which the output signal is coupled to the receiver 32.

The synchronous detectors 40 and 42 are utilized for recovering the elevation and azimuthal error signals after their amplification and demodulation by the receiver 32. Since the same reference signals, namely, the signals of the oscillators 36 and 38, are utilized for both the operation of the Faraday rotators as well as for operation of the synchronous detectors, the modulations imparted by the modulator 30 to the elevation and azimuthal signals are in synchronism with the reference signals. Therefore, they can be readily separated from each other and from the other signals amplified and demodulated by the receiver 32 by use of the synchronous detectors 40 and 42. The elevation and azimuthal error signals recovered from the receivers 32 by the synchronous detectors 40 and 42 are then applied to the antenna pointing unit 26 for pointing the antenna 22 at the source of the beacon signal in the earth station.

The receiver 32 comprises a mixer 56, an oscillator 58, and a wide-band filter 60. The oscillator 58 provides a stable signal of constant frequency which is mixed with the output signal of the modulator 30 at the mixer 56. The mixing operation reduces the frequency of the output signal of the modulator 30 from the transmitted frequency to an intermediate frequency, which frequency is captured by the filter 60. The receiver 32 further comprises an amplitude detector 62, a frequency discriminator 64, a narrow-band filter 66, a mixer 68, a VCO (voltage controlled oscillator) 70 and a low-pass filter 72. The output of the frequency discriminator 64, in combination with the filter 72 and the VCO 70, provides a feedback loop in which the VCO 70 is made to track the frequency modulation of the IF(Intermediate Frequency) signal from the filter 60.

The output signal of the VCO 70 is mixed with the signal passed by the filter 60 at the mixer 68. Since the VCO 70 tracks the frequency of the signal passed by the filter 60, the output signal of the mixer 68, which is captured by the narrow-band filter 66, is reduced in bandwidth to fall within the bandwidth of the filter 66. The filter 66 is understood to include an amplifier for amplification of the output signal of the mixer 68. The filter 66 can be of narrower bandwidth than that of the filter 60 due to the reduction of the frequency modulation at the output of the mixer 68. Thus, the amplifier in the circuit of the filter 66 is most useful in amplifying the telemetry and the beacon tracking signals since the amplification can be done at minimal band width for a maximum improvement in the signal-to-noise ratio. The discriminator 64 functions as a detector of differences in frequency and provides an output signal at dc (direct current) or with relatively slow variations which are passed by the low-pass filter 72 to the control terminal of the VCO 70.

The operation of the foregoing loop is often utilized in command receivers because of its capacity for capturing frequency modulation and providing high amplification at minimal bandwidth. The captured frequency modulation appears on line 78 at the output terminal of the VCO 70. The bandwidth of the filter 66 is large enough to pass the frequency-modulation spectrum of the command modulation as well as the amplitude modulation of the beacon-tracking signals, namely the elevation and azimuthal error signals. These frequency modulation signals appear at the output terminals of the discriminator 64 and are rejected by the low-pass cut-off of the filter 72. These signals are captured by the filter 74, the output of the amplitude detector 62 being passed by the filter 76. The filter 74 outputs the command data on line 80 while the filter 76 outputs the beacon track data to the synchronous detectors 40 and 42. In this manner, the receiver 32 is able to provide carrier frequency data, command data and the elevation and azimuthal error signals.

With respect to the modulation of the command data, it is noted that this modulation is in the form of phase modulation or frequency modulation. The amplitude of the input signal to the receiver, on line 54, is of constant amplitude insofar as the command data and the carrier data is concerned. In the presence of the beacon track data, an amplitude modulation also appears on line 54. The amplitude modulation is desirable in that it can be imposed upon the command signal without distorting the signal in the amplification process and without distorting the signal during the processes of modulation and demodulation. The amplitude modulation is a further advantage in the use of the modulator.

Figure 2:
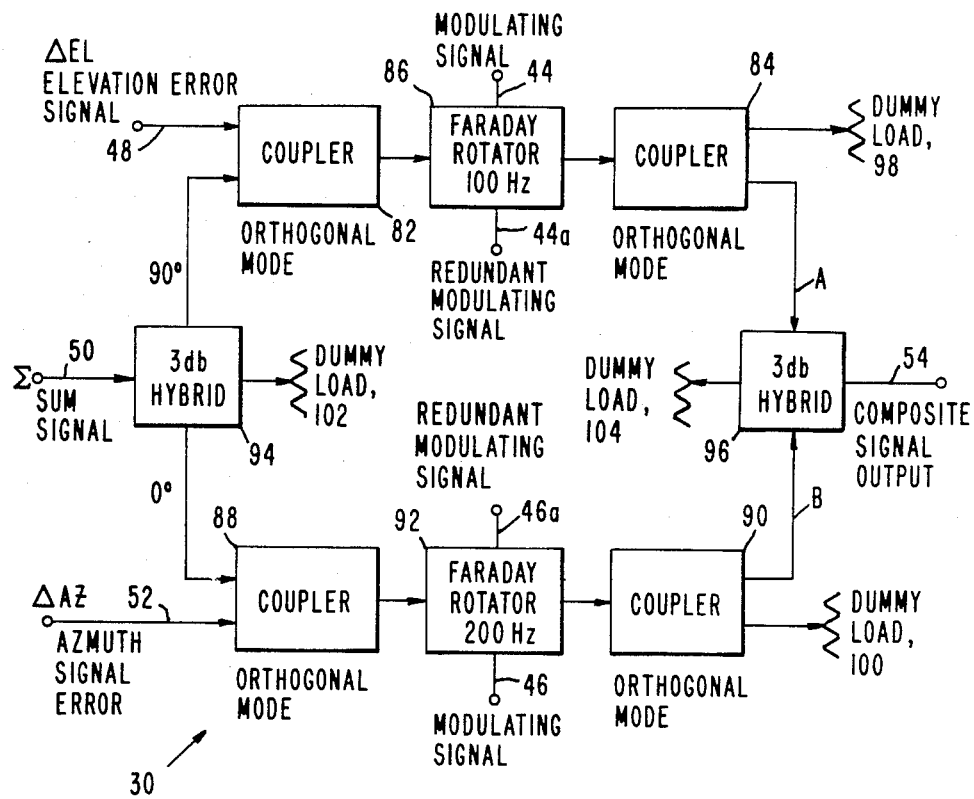
FIG. 2 is a block diagram of the modulator of FIG. 1, the modulator incorporating the invention.

FIG. 2 shows the circuitry of the modulator 30. The modulator 30 includes an upper channel and a lower channel, the upper channel comprising couplers 82 and 84 and a rotator 86. The lower channel comprises couplers 88 and 90 and a rotator 92. The couplers 82, 84, 88 and 90 are each orthogonal mode couplers. The rotators 86 and 92 are Faraday rotators. One input signal to the coupler 82 is the elevation error signal on line 48, the line 48 representing a wave guide with horizontal polarization. One input to the coupler 88 is the azimuthal error signal coupled via line 52, the line 52 being a wave guide with the signal therein being horizontally polarized. The second input terminal of the coupler 82 and the second input terminal of the coupler 88 each receive the sum signal of line 50, the line 50 also being a wave guide. The power provided by the line 50 is applied to a hybrid power divider 94 which divides the power of the sum signal equally between the couplers 82 and 88. The connections between the divider 94 and to the couplers 82 and 88 are made by wave guide with the signals therein having vertical polarization.

In accordance with the well-known operation of a hybrid power divider, the signals at the output ports which are coupled to the couplers differ in phase by 90°. Thus, the power coupled from the divider 94 to either one of the couplers 82 and 88 is one-half, or 3 dB (as above). A similar microwave circuit, namely, a hybrid power combiner 96, joins corresponding output terminals of the coupler 84 and 90 to provide a composite signal on line 54. The connections between the combiner 96 and the couplers 84 and 90 are made of wave guides. Since only one of the two output terminals of each of the couplers 84 and 90 are connected to the combiner 96, the second output terminal of each of the couplers 84 and 90 are coupled, respectively, to dummy loads 98 and 100. Dummy loads 102 and 104 are utilized for terminating, respectively, a third output terminal of the divider 94 and a third output terminal of the combiner 96.

Figure 3:
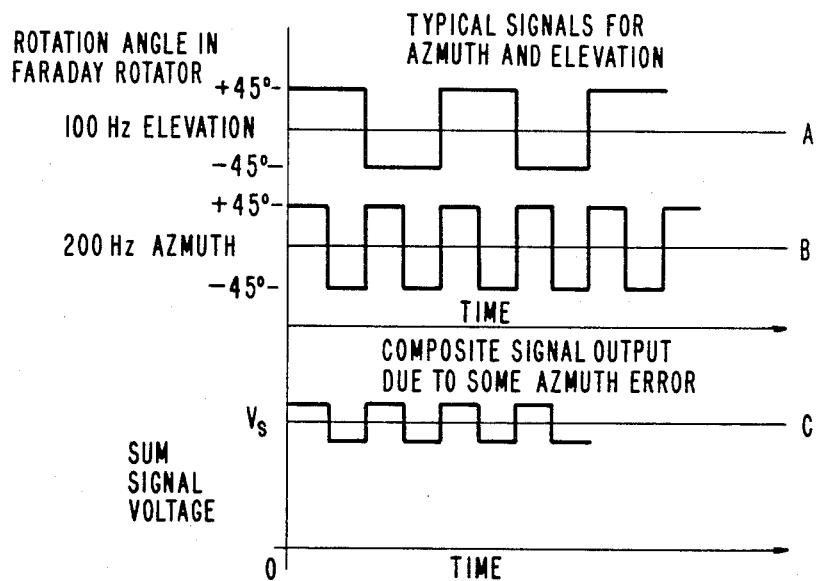
FIG. 3 is a diagram showing a set of graphs depicting the temporal relationships among wave forms of signals of the modulator of FIG. 2.

With reference also to FIG. 3, the operation of the modulator 30 is as follows. In the absence of energization of the rotators 86 and 92, a horizontally polarized signal on line 48 passes through the coupler 82, the rotator 86 and the coupler 84 to appear at the dummy load 98. Similarly, a horizontally polarized signal on line 52 passes through the coupler 88, the rotator 92 and the coupler 90 to appear at the dummy load 100. Also, the sum signal of line 50, upon appearing at a vertically polarized signal at input terminals to the couplers 82 and 88, passes through the couplers 82 and 88, and then through the rotators 86 and 92, respectively, then through the couplers 84 and 90, respectively, to be combined by the combiner 96. Thus, in the absence of energization of the rotators 86 and 92, the sum signal at line 50 reappears at the output terminal of the combiner 96 on line 54.

Upon energization of the rotators 86 and 92 with their respective modulation signals, namely, the 100 Hz signal on line 44 and the 200 Hz signal on line 46, the foregoing description of the transit of the signals on the lines 48, 50 and 52 is repeated up to the input terminals of the rotators 86 and 92. The rotators 86 and 92 now rotate the polarization vector of the combined horizontally polarized signal and vertically polarized signal. As a result, the output signals of the rotators 86 and 92 differ in the case of energization of the rotators from the case of the deenergization of the rotators. With the energization of the rotators 86 and 92, and with the resultant shift in the orientation of the polarization vector, components of the error signal of lines 48 and 52 appear respectively in both of the output ports of the couplers 84 and 90. Also, components of the sum signal of line 50 appear in both output ports of the couplers 84 and 90. The lines 48 and 52 are adjusted in length to make the output signal at line 54 resulting from the azimuth, elevation and sum signals in phase (or 180° phase shift). Accordingly, the composite signals at line 54 contain a reduced amount of the sum signal of line 50 while also containing components of the elevation signal of line 48 and the azimuth signal of line 52.

In the usual case, the amplitude of the elevation signal on line 48 and the amplitude of the azimuth signal on line 52 are each much smaller than the sum signal on line 50. Thus, the energization and de-energization of the rotators 86 and 92 produce variations in the amplitude of the composite signal on line 54. Also, variations in amplitude appear at the two input ports of the combiner 96 from the couplers 84 and 90. As portrayed in the upper graph in FIG. 3, the 100 Hz square-wave signal on line 44 to the rotator 86 produces a square-wave modulation to the output signal of the coupler 84 on line A. Similarly, the 200 Hz signal on line 46 to the rotator 92 produces a 200 Hz square-wave amplitude modulation to the output signal from the coupler 90 on line B. This is portrayed in the second graph of FIG. 3. The third graph of FIG. 3, identified by the legend C, depicts the combination of the two modulation waveforms of the first and second graphs for the case of zero elevation error, this composite amplitude modulation appearing on line 54 at the output of the modulator 30.

Figure 4:
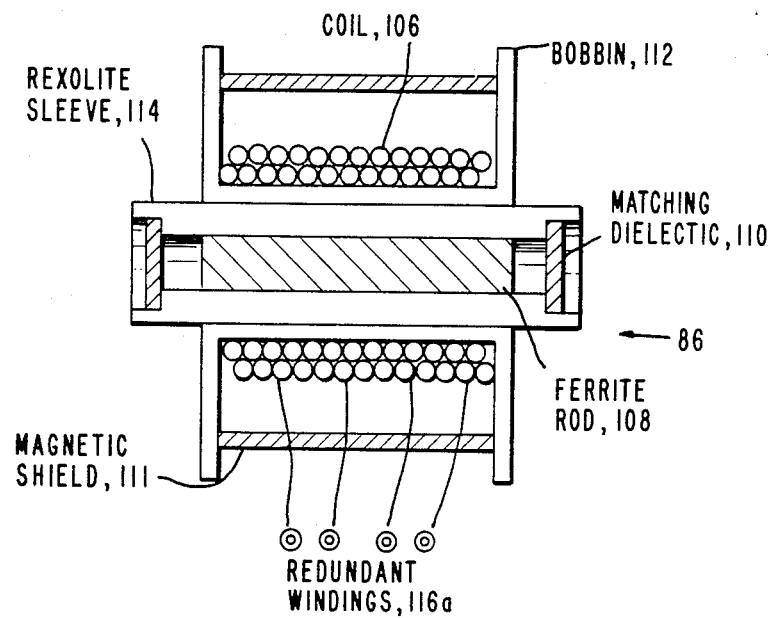
FIG. 4 is a stylized sectional view of a Faraday rotator of the modulator of FIG. 2.
Figure 5:
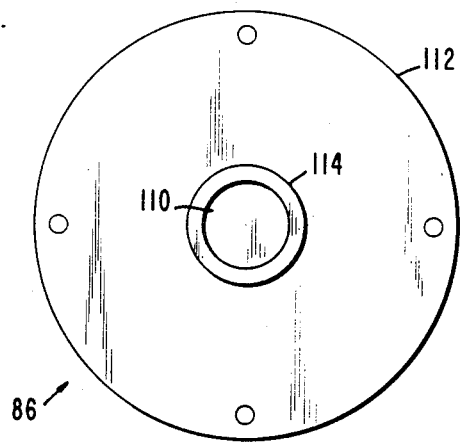
FIG. 5 is an end view of the rotator of FIG. 4.

With reference also the FIGS. 4 and 5, square-wave signals provided by the oscillators 36 and 38 (FIG. 1) on lines 44 and 46 provide both positive and negative excursion of current which drives winding or coil 106 of the rotator 86. The description herein relative to the rotator 86 applies also to the rotator 92 which is of the same construction. Since the current in the winding 106 is driven in alternating directions, the resulting polarization is rotated in a positive direction and in a negative direction, alternately. The magnitude of the current is adjusted to provide for a positive rotation of 45°, and a negative rotation of 45° as is depicted in the first and second graphs of FIG. 3.

With respect to the construction of the rotator 86, in addition to the winding 106, the rotator 86 comprises a ferrite rod 108, an impedance matching element 110, a bobbin 112 for support of the winding 106, and a sleeve 114 which surrounds the rod 108 and is supported by the bobbin 112. A magnetic shield 116 encloses the winding 106.

The ferrite rod 108 is fabricated of a yttrium iron garnet material. The sleeve 114 is fabricated of plastic while the bobbin 112 is made of stainless steel. The stainless steel, due to its high resistivity, reduces the switching time caused by the effect of a shorted turn. Current in the winding 106 induces a magnetic biasing field in the ferrite rod 108. It is advantageous to fabricate the magnetic shield 116 of a high permeability material as it tends to reduce the rise time of the magnetic field during the square-wave modulation process, and also increases the rotation sensitivity.

With respect to redundancy, the rotator 86 (and also the rotator 92) includes a redundant winding 106A activated by a redundant oscillator (not shown) along line 44A (46A in the case of the rotator 92). Thereby, the rotators 86 and 92 can function even in the event of a failure of an oscillator 36 or 38, or in the event of a failure of a winding 106. Such redundancy increases the reliability of the system 20.

In view of the foregoing description, it is apparent that the invention has provided for the multiplexing and modulation of beam-tracking signals onto a common carrier which also carries command data. The modulation has been accomplished in a manner which provides for increased reliability while insuring the high quality of the command signal. The modulation technique permits the beam-tracking signals to be extracted accurately from the composite signal. A single-channel receiver amplifies the composite signal to provide for the concurrent amplification of both the beam-tracking signals and the telemetry signal.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A modulator for converting a three-channel input microwave signal to a single channel output microwave signal comprising:
   (a) a first section and a second section;
   (b) each of said sections comprising an input orthogonal-mode coupler, an output orthogonal-mode coupler, and a Faraday rotator connected between said input coupler and said output coupler, said couplers being arranged in back-to-back relation relative to said rotator for connection of a single port of each of said couplers to said rotator with one coupler connected to an input terminal of said rotator and the other coupler being connected to an output terminal of said rotator;
   (c) hybrid means for division and a combination of microwave power, one of said hybrid means connecting a first input port of the input coupler in each of said sections to a third channel of said input microwave signal, a second of said hybrid means connecting a first hybrid port of the output coupler in each of said sections to said single channel output microwave signal; and wherein
   (d) a first channel of said input microwave signal connects with a second input of the input coupler in said first section;
   (e) a second channel of said input microwave signal connects with a second input port of the input coupler in said second section;
   (f) said system further comprises dummy loads, and the second output ports in said output couplers of said first and said second sections are terminated by said dummy loads; and wherein
   (g) said system further comprises means for operating said rotators at different modulation frequencies to introduce amplitude modulation patterns which may be subsequently operated from the single channel output signal irrespective of phase and frequency modulations which may otherwise be present on all of said microwave signals for communication of data.

2. A system according to claim 1 wherein the first input port of the input coupler in each of said sections carries a vertically polarized signal, and wherein the second input port in the input coupler in each of said sections carries a horizontally polarized signal.

3. A system according to claim 2 wherein the first output port of the output coupler in each of said sections carries a vertically polarized signal and wherein the second output port in the output coupler in each of said sections carries a horizontally polarized signal.

4. A system according to claim 3 wherein the input coupler in each of said sections applies a microwave signal to said rotator, said microwave signal having both horizontal and vertical components, and wherein said rotator alters the direction of polarization of the signal applied to said rotator upon energization of said rotator with current at a modulation frequency, the output signal of the rotator having the altered direction of polarization being shared among the two output ports of the output coupler in each of said sections.

5. A system according to claim 4 further comprising:
   (a) an amplifier for amplifying the single channel output microwave signal from said second hybrid means;
   (b) a source of reference signals for operating the rotator in said first section at a first modulation frequency and for operating the rotator in said second section at a second modulation frequency;
   (c) synchronous detection means coupled to an output of said amplifier and driven by said reference source for extracting the signal of said first input microwave channel and for extracting the signal of said third input microwave channel; and wherein
   (d) the energization of said synchronous detectors and of said rotators by said reference source is accomplished in synchronism.

6. A modulator system for converting a three-channel input microwave signal to a single-channel output microwave signal comprising:
   (a) means for converting said three-channel signal to a two-channel signal of which a first signal is carried by a first microwave section and of which a second signal is carried by a second microwave section;
   (b) the signals in each of said sections having horizontal and vertical polarization components of which the vertical component produced by a third input signal of said three-channel input signal is common to both said first section and said second section;
   (c) each of said sections including a rotator for rotating the polarization of the signal contained in the respective sections, said rotation occurring upon activation of said rotator, the original polarization being maintained in the absence of activation of said rotator;
   (d) means for combining output signals of the rotators in each of said sections to produce said single-channel output microwave signal, said combining means including means for extracting a common polarization component of the signals of each of said sections; and wherein
   (e) each of said rotators, upon activation by a modulating signal introduces a modulation pattern to the rotation of the polarization resulting in the production of an amplitude modulation in said single-channel microwave signal.

7. A system according to claim 6 further comprising:
   (a) an amplifier for amplifying said single-channel output signal of said combining means;
   (b) a source of reference signal for driving said rotators, respectively, with modulation patterns of differing frequencies; and
   (c) synchronous detection means coupled to an output of said amplifier and driven by said signals of said reference signal source for extracting the signals of said first and second input microwave channels.

8. A modulator for converting a three-channel input microwave signal to a single channel output microwave signal comprising:

(a) a first section and a second section;

(b) each of said sections comprising an input orthogonal-mode coupler, an output orthogonal-mode coupler, and a Faraday rotator connected between said input coupler and said output coupler, said couplers being arranged in back-to-back relation relative to said rotator for connection of a single port of each of said couplers to said rotator with one coupler connected to an input terminal to said rotator and the other coupler being connected to an output terminal of said rotator;

(c) hybrid means for division and a combination of microwave power, one of said hybrid means connecting a first input port of the input coupler in each of said sections to a third channel of said input microwave signal, a second of said hybrid means connecting a first hybrid port of the output coupler in each of said sections to said single channel output microwave signal; and wherein (d) a first channel of said input microwave signal connects with a second input of the input coupler in said first section;

(e) a second channel of said input microwave signal connects with a second input port of the input coupler in said second section;

(f) said system further comprises dummy loads, and the second output ports in said output couplers of said first and said second sections are terminated by said dummy loads; and wherein (g) each of said rotators comprises a ferrite element with means for guiding a microwave signal through said ferrite elements, and a plurality of coils having terminals arranged for independent excitation with electric current, said coils being positioned about said ferrite element for independent application of magnetic fields to said ferrite element to provide redundant operation of said modulator; and wherein (h) said system further comprises means for operating said rotators at different modulation frequencies to introduce amplitude modulation patterns which may be subsequently operated from the single channel output signal irrespective of phase and frequency modulations which may otherwise be present on all of said microwave signals for communication of data.

9. A modulator according to claim 8 wherein the first input port of the input coupler in each of said sections carries a vertically polarized signal, and wherein the second input port in the input coupler in each of said sections carries a horizontally polarized signal; and wherein the first output port of the output coupler in each of said sections carries a vertically polarized signal and wherein the second output port in the output coupler in each of said sections carries a horizontally polarized signal.

10. A modulator according to claim 8 wherein the input coupler in each of said sections applies a microwave signal to said rotator, said microwave signal having both horizontal and vertical components, and wherein said rotator alters the direction of polarization of the signal applied to said rotator upon energization of said rotator with current at a modulation frequency, the output signal of the rotator having the altered direction of polarization being shared among the two output ports of the output coupler in each of said sections; and wherein said system further comprises:

(a) an amplifier for amplifying the single channel output microwave signal from said second hybrid means;

(b) a source of reference signals for operating the rotator in said first section at a first modulation frequency and for operating the rotator in said second section at a second modulation frequency;

(c) synchronous detection means coupled to an output of said amplifier and driven by said reference source for extracting the signal of said first input microwave channel and for extracting the signal of said third input microwave channel; and wherein (d) the energization of said synchronous detectors and of said rotators by said reference source is accomplished in synchronism.

11. A modulator system for converting a three-channel input microwave signal through a single-channel output microwave signal comprising:

(a) means for converting said three-channel signal to a two-channel signal of which a first signal is carried by a first microwave section and of which a second signal is carried by a second microwave section;

(b) the signals in each of said sections having horizontal and vertical polarization components of which the vertical component produced by a third input signal of said three-channel input signal is common to both said first section and said second section;

(c) each of said sections including a rotator for rotating the polarization of the signal contained in the respective sections, said rotation occurring upon activation of said rotator, the original polarization being maintained in the absence of activation of said rotator;

(d) means for combining output signals of the rotators in each of said sections to produce said single-channel output microwave signal, said combining means including means for extracting a common polarization component of the signals of each of said sections; and wherein (e) each of said rotators comprises a ferrite element with means for guiding a microwave signal through said ferrite elements, and a plurality of coils having terminals arranged for independent excitation with electric current, said coils being positioned about said ferrite element for independent application of magnetic fields to said ferrite element to provide redundant operation of said system; and wherein (f) each of said rotators, upon activation by a modulating signal introduces a modulation pattern to the rotation of the polarization resulting in the production of an amplitude modulation in said single-handed microwave signal.

12. A system according to claim 11 further comprising:

(a) an amplifier for amplifying said single-channel output signal of said combining means;

(b) a source of reference signal for driving said rotators, respectively, with modulation patterns of differing frequencies; and (c) synchronous detection means coupled to an output of said amplifier and driven by said signals of said reference signal source for extracting the signals of said first and said second input microwave channels.

13. A modulator system for converting a three-channel input microwave signal through a single-channel output microwave signal comprising:
  (a) means for converting said three-channel signal to a two-channel signal of which a first signal is carried by a first microwave section and of which a second signal is carried by a second microwave section;
  (b) the signals in each of said sections having horizontal and vertical polarization components of which the vertical component produced by a third input signal of said three-channel input signal is common to both said first section and said second section;
  (c) each of said sections including a rotator for rotating the polarization of the signal contained in the respective sections, said rotation occurring upon activation of said rotator, the original polarization being maintained in the absence of activation of said rotator;
  (d) means for combining output signals of the rotators in each of said sections to produce said single-channel output microwave signal, said combining means including means for extracting a common polarization component of the signals of each of said sections; and wherein
  (e) each of said rotators includes means for redundant modulation of the rotation of polarization of microwave signals, said modulation introducing an amplitude modulation in said single-channel microwave signal.

14. A system according to claim 13 wherein each of said rotators comprises a ferrite element with means for guiding a microwave signal through said ferrite elements, and a plurality of coils having terminals arranged for independent excitation with electric current, said coils being positioned about said ferrite element for independent application of magnetic fields to said ferrite element to provide redundant operation of said system.

15. A system according to claim 14 further comprising:
  (a) an amplifier for amplifying said single-channel output signal of said combining means;
  (b) a source of reference signal for driving said rotators, respectively, with modulation patterns of differing frequencies; and
  (c) synchronous detection means coupled to an output of said amplifier and driven by said signals of said reference signal source for extracting the signals of said first and said second input microwave channels.

* * * * *